July 25, 1967  C. W. ALLEN  3,332,445
SOLENOID ACTUATED VALVE WITH MANUAL OVER-RIDE
Filed Dec. 6, 1963  2 Sheets-Sheet 1

INVENTOR.
Clifford W. Allen
BY Ralph W. McIntire, Jr.
Attorney

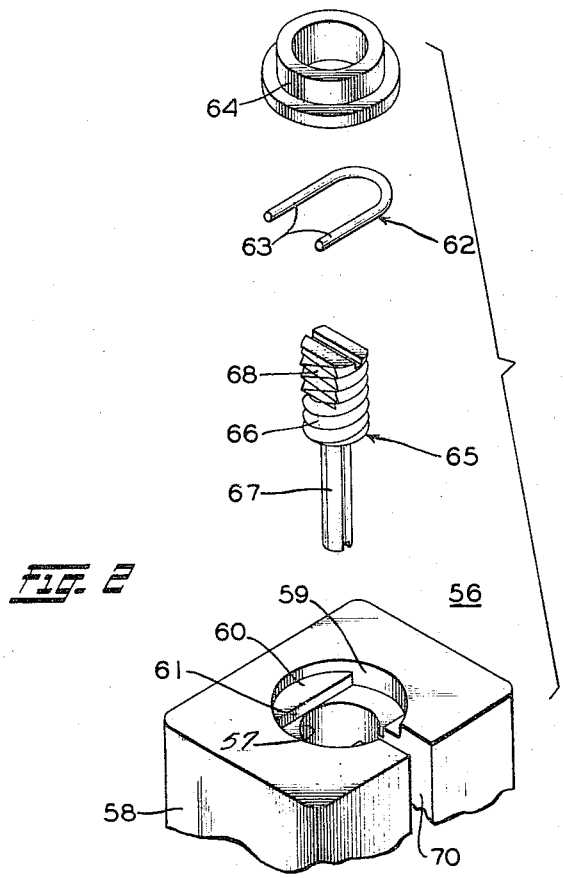
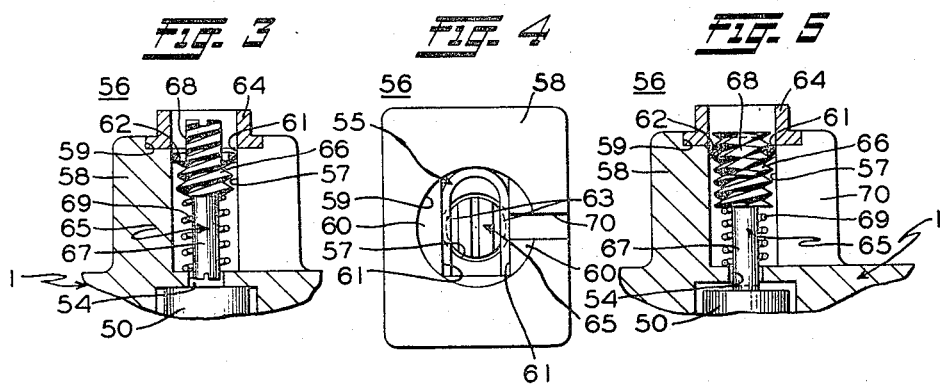

United States Patent Office 3,332,445
Patented July 25, 1967

3,332,445
SOLENOID ACTUATED VALVE WITH
MANUAL OVER-RIDE
Clifford W. Allen, Monroeville, Pa., assignor to Westinghouse Air Brake Company, Wilmerding, Pa., a corporation of Pennsylvania
Filed Dec. 6, 1963, Ser. No. 328,755
3 Claims. (Cl. 137—627.5)

This invention relates generally to solenoid actuated valves with manual override and relates more specifically to pilot or poppet valves of this type.

As is known, conventional valving devices usually require maximum operating force during initial valve movement, and gradually decreasing force during valve travel. However, inasmuch as a solenoid produces minimum force during the initial movement of the solenoid armature, a larger solenoid is required to initially open a valve than is required to move the valve and hold the valve in an open position. Moreover, to assure quick opening operation of any valve without hesitation requires a solenoid force considerably greater than the minimum required valve opening force.

It is the object of the present invention to construct a valve device in which fluid forces on the valve member are balanced so as to make more efficient use of solenoid force, thus permitting the utilization of a smaller solenoid to perform the pilot valve operation.

In the present invention, the above object is achieved by disposing an exhaust valve stem coaxially movable with the plunger of the solenoid and with respect to the pilot valve, the exhaust stem being movable downwardly, by the movement of the plunger, to a closed condition occurring upon contact of the exhaust valve stem end with the pilot valve, the latter being movable downwardly against a spring bias from a normally closed position on a supply valve seat to an open position away from the seat to connect a supply passage, disposed below the pilot valve seat, with a delivery passage, disposed above the pilot valve seat, in response to further downward movement of the hollow valve stem. The delivery passage is communicated with a chamber surrounding a shoulder on the pilot valve member to provide an upward force on the pilot valve counteracting the supply force on the face of the valve tending to separate the valve from the exhaust stem when the pilot valve is moved away from the pilot valve seat. A central bore is provided in the pilot valve member coaxially with the hollow stem to communicate a chamber formed by the space between the bottom end of the pilot valve member and the end of the bore to admit pressure from the face of the valve to the lower side of the valve for counteracting or balancing the pressure on the face of the valve when the solenoid is de-energized to permit closing of the pilot valve and opening of the exhaust valve.

A novel manual operator device is provided to permit manual operation of the pilot valve independently of the solenoid device to either lock the pilot valve in the open condition or to check the condition of energization of the solenoid.

These and other objects will be more readily apparent in the following description, taken in conjunction with the drawings, in which:

FIG. 2 is an exploded perspective view of the manual operator device;

FIG. 3 is a cross-sectional view of the manual operator shown in FIG. 2, and showing the operator in the de-actuated condition;

FIG. 4 is a top plan view of the manual operator of FIG. 2 with portions thereof removed for convenience of illustration, and FIG. 5 is a cross-sectional view of the manual operator of FIG. 2 showing the operator in an actuated condition.

Figure 1:
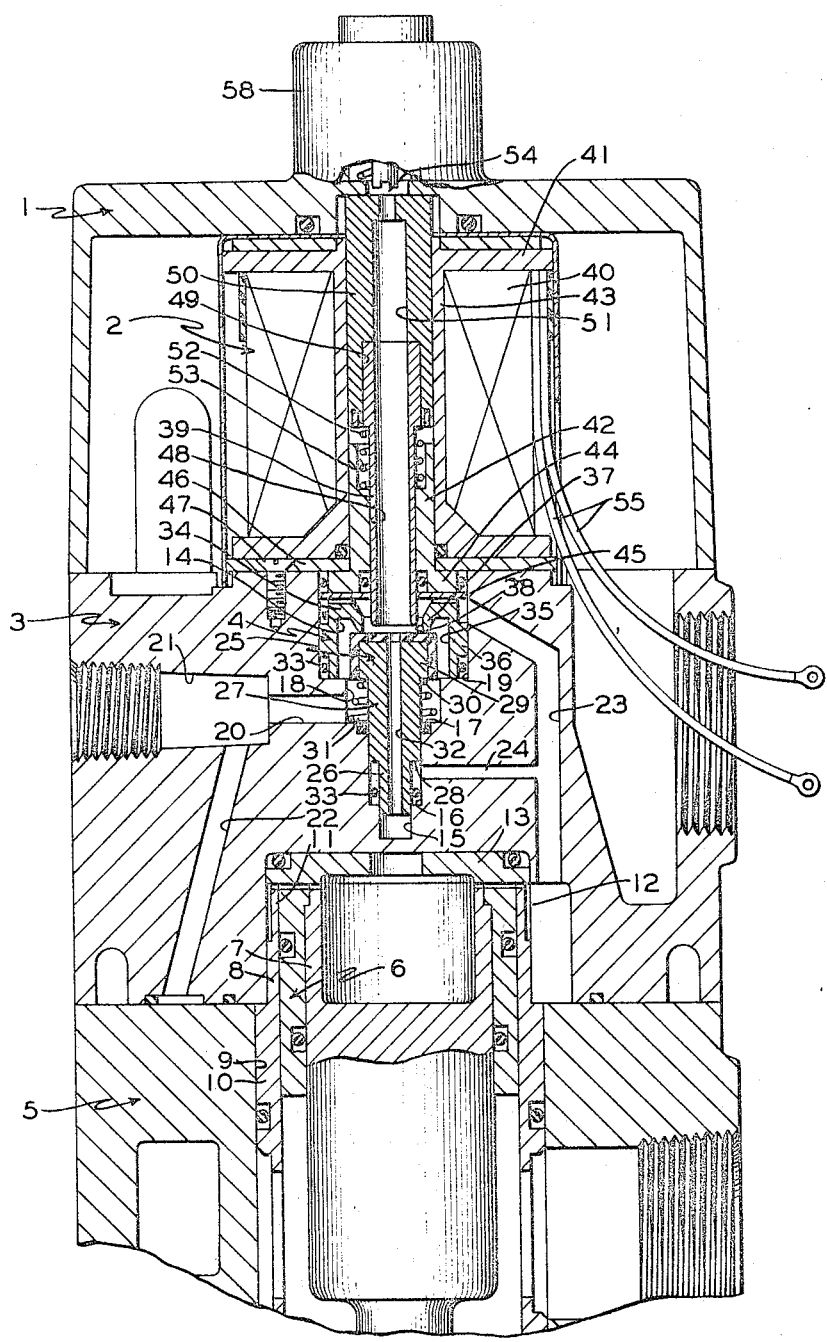
FIG. 1 is a cross-sectional view of a solenoid operated pilot valve device, showing the present invention.

Referring now to FIG. 1 of the drawings, there is generally disclosed a solenoid housing 1 having a solenoid device 2 disposed therein, a pilot valve housing 3 to which the solenoid housing 1 is attached and having a pilot valve device 4 disposed therein, and a spool valve housing 5 to which the pilot valve housing 3 is attached and having a spool valve device 6 disposed therein for operation in response to operation of the pilot valve device 4, as hereinafter explained.

The spool valve device 6, the details of which do not form a part of the present invention, comprises a spool valve member 7 having a sleeve 8 tightly fitted over the end portion thereof to form a piston for moving the spool valve member 6 longitudinally in bore 9 in the spool valve housing 5. A liner assembly 10 is fitted in the bore 9 between the bore 9 and spool valve member 6, and includes an end portion 11 of smaller outside diameter than the remainder of the liner assembly forming a space 12 between the bore 9 and the liner assembly 10 for receiving fluid under pressure provided to the space 12 by the pilot valve device 4, as hereinafter described, which fluid leaks between an end member 13 disposed in the end of bore 9 and the end of sleeve 8 to provide pressure on the sleeve or piston 8 to effect movement of the spool valve member 7. The pilot valve device 4 is disposed mainly within a bore 14 in pilot valve housing 3, which bore comprises a main bore 15 having a plurality of progressively larger counterbores 16, 17, 18 and 19. A main pressure supply passage 20 in the housing 3 communicates at one end with the counterbore 18 and at the other end with alternate pressure supply inputs 21 and 22. A pressure delivery passage 23 in the housing 3 communicates at one end with the upper portion of bore 19 and at the other end with space 12 in bore 9 in the spool valve housing 5. The delivery passage 23 is communicated with counterbore 16 by way of a passage 24 provided in the housing 3, for the purpose of valve balancing, as hereinafter described in detail.

The main portion of the pilot valve mechanism 4 comprises a cylindrical member 25 having a lower portion 26 slidably fitted in bore 15, an intermediate portion 27 of larger diameter than lower portion 26 forming a shoulder 28 and slidably fitted in counterbore 16, and a rubber surfaced valve head portion 29 of yet larger diameter forming a shoulder 30. A biasing spring 31 is compressibly disposed between the bottom of bore 18 and the shoulder 30 to bias the valve member 25 upwardly to a closed position, as shown in FIG. 1, and as hereinafter described in more detail.

An axial bore 32 is provided through valve member 25 to communicate the space above the surface 33 of head portion 29 with bore 15 to provide a valve balancing function, as hereinafter described.

In order to cooperate with the valve member 25 in controlling fluid communication between the supply passage 20 and the delivery passage 23, there is provided a valve seat member 34 comprising a hollow cylinder 35 seated on the bottom of counterbore 19. A radial flange 36 is provided on the outside of cylinder 35 for engaging the wall of counterbore 19 providing a space between the upper portion of the cylinder 35 and the wall of counterbore 19 adjacent the delivery passage 23. A downwardly and inwardly extending truncated conical flange 37 is provided on the upper end of cylinder member 35 terminating in an aperture 38, the edge of which aperture forms a valve seat for the valve head 29 of valve member 25, as shown in FIG. 1. Suitable radial grooves, as shown, are provided on the upper end of cylinder 35 to communicate the interior of conical flange 37 with the space between the cylinder 37 and bore 19. Suitable sealing members such as O-rings 33 are provided at the bottom portion of each of the counterbores 19, 17 and 16 to prevent fluid communication between the adjacent bore and counterbores.

The opening and closing operation of the valve member 25 and the exhaust function of valve member 25 is effected by a hollow exhaust stem 39 disposed axially of the valve member 25 and which is movable longitudinally by the solenoid device 2 as described below.

The solenoid device 2 comprises a coil 40 wound upon a spool member 41 having a pole piece 42 fixed in the lower end of the solenoid core 43. The pole piece 42 includes at its lower end an outwardly extending flange 44 disposed within counterbore 19 and resting upon a washer 45 disposed on the upper end of valve seat member 34. A flux plate 46 is disposed flush with the end of housing 3 and overlies the flange 44 to hold the pole piece 42 and valve seat member 34 in place, as shown, by means of a screw 47. The hollow valve stem 39 is slidably disposed in an axial bore 48 in pole piece 42 to engage and open valve member 25. In order to effect movement of the valve stem 39, the upper end thereof is fixedly received within an axial bore 49 in the solenoid armature or plunger 50 in coaxial alignment with an exhaust counterbore 51 in the plunger 50. A spring 52 is provided in a bore 53 coaxial with the bore 48 for biasing plunger 50 to its uppermost position, as shown in FIG. 1. An aperture 54 is provided in the solenoid housing 1 to connect the bore 51 to atmosphere, as described hereinafter in detail.

In the operation of the device, the solenoid coil 40 is energized by current supplied through electrical wiring 55, which induces a magnetic flux in plunger 50 and pole 42 along a vertical path. Since an air gap exists between pole 42 and plunger 50, the latter is urged downwardly to carry exhaust valve stem 39 downwardly until pole 42 is contacted.

As stem 39 moves downwardly, valve member 25 is contacted at approximately ½ travel, thus closing the exhaust valve stem 39. Further movement of valve stem 39 forces valve member 25 away from valve seat 38, thereby opening the pilot valve 25 to admit fluid under pressure from supply passage 20 past valve member 25 and valve seat 38 through ports, not shown, in the valve seat member 34 to delivery port 23 and on to the spool valve device 6.

When the solenoid device 2 is deenergized, the foregoing steps are reversed whereupon pilot valve 25 returns to the closed condition and valve stem 39 is fully raised to communicate delivery passage 23 to atmosphere through stem 39, bore 51 and aperture 54.

Balancing of the valve member 25 by way of bore 32 through valve member 25 and by way of passage 24 communicating delivery passage 23 with counterbore 16 during the above-described operations is described as follows. When valve 25 is in the closed condition as shown in FIG. 1, supply pressure through passage 20 provides a predetermined upward force on valve head portion 25 as determined by the predetermined area of shoulder 30. When the solenoid is energized, the head portion 29 of valve 25 is exposed to supply pressure on that portion of the surface 30 outside of the seating diameter of stem 39 thereon, therefore, supply pressure is admitted through delivery passage 23 and passage 24 to counterbore 16 to provide a counterbalancing upward force on valve member 25 to hold valve member 25 against valve stem 39, which force is predetermined in accordance with the predetermined area of shoulder 28 on valve member 25. When the solenoid is deenergized, the magnetic field collapses, thus allowing plunger 49 to be forced upwardly by the combined action of spring 52 against hollow stem 39, by supply valve spring 31 against valve member 25, and from air loading as now described. Initially, valve member 25 stops upward movement at the valve seat 38, closing off supply passage 20 from delivery passage 23. Further upward travel of plunger 49 and hollow valve stem 39 allows communication from delivery passage 23 through hollow valve stem 39 to exhaust bore 51 and port 54 to atmosphere. At this instant of exhaust, the entire head portion 29 of valve member 25 is exposed to downward pressure tending to separate the valve 25 from the stem 39, which downward pressure must be counterbalanced by additional pressure beneath valve member 25. The central bore 32 in valve member 25 allows this pressure present at the head portion 29 to communicate with bore portion 15 providing a partial counterbalancing action. The remainder of the force by valve member 25 is counterbalanced by pressure from delivery passage 23 through passage 24 to shoulder 28, as above described. The exhaust pressure from delivery passage 23 and passage 24 escapes to atmosphere, as above described, allowing spool valve member 7 to return to its original position as shown in FIG. 1. The spool valve member 7 may be urged to its original position, as shown, by means of a return spring or air loading, not shown, upon the other end of the spool valve member.

Referring now to FIGS. 2, 3, 4 and 5 of the drawings, in order to provide manual operation of the hollow valve stem 39 to effect an opening operation of pilot valve member 25, there is provided a manual operating device 56 disposed in a bore 57 in boss member 58 integral with the solenoid housing 1, the bore 57 coaxially communicating with the aperture 54 in housing 1. A counterbore 59 of larger diameter than bore 57 is provided at the top of bore 57, within which counterbore there are disposed a pair of depressed shoulder or ledge members 60, 60 having their inner edges 61, 61 disposed mutually parallel and in tangential relationship with the bore 57, as best seen in FIG. 2. A U-shaped spring wire 62 is disposed in flat position in the counterbore 59 in perpendicular position with the bore 57 so that the legs 63, 63 of the wire 62 longitudinally abut the edges 61, 61 of the shoulders or ledges 60, 60 so that the mid-portion of each leg 63 overhangs the upper end of bore 57. A collar member 64 is fixed in the counterbore 59 for retaining the spring wire 62 in the position described. A screw member 65 having a threaded upper portion 66 of greater outside diameter than the distance between the legs 63, 63 of the spring 62, an unthreaded lower portion 67 and a pair of opposing flat portions 68, 68 on the upper threaded portion 66, is disposed for axial movement in the bore 57 whereby the lower portion 67 passes through the aperture 54 in the lowermost position of the screw member 58, as shown in FIG. 5, and whereby the upper flat portions 68 may extend upwardly between the leg members 63, 63 when the screw member 65 is in the uppermost position, as shown in FIG. 3. A spring 69 is disposed between the bottom of bore 57 and the threaded portion 66 of screw member 65 to normally bias the screw 65 to the upper position, as shown in FIG. 3. A longitudinal slot 70 is provided in the boss 58 to communicate with the aperture 54 for providing connection of the exhaust passage 51 to atmosphere.

In normal operation of the manual operator, when the flat portions 68, 68 of screw 65 are parallel with the legs 63, 63 of the wire 62, as shown in FIG. 3, the upper portion of the screw is urged upwardly by the spring 69 to hold the lower end of the screw 65 out of engagement with the plunger 50. Depressing the screw member to the position shown in FIG. 5 will depress solenoid plunger 50 to operate the valve member 25 hereinbefore described. Depressing screw 65 and turning it ¼ turn in either direction will lock it in the downward position, since spring wire 62 then engages the threads of the threaded upper portion 66. The override device 56 may then be deactuated by rotating screw 65 in either direction ¼ turn as by means of a screw driver. Spring 69 returns screw 65 to the upward position, as shown in FIG. 3, permitting the solenoid plunger 50 to return to its normal upward position to effect closing of the valve member 25 in the manner hereinbefore described.

Having now described the invention, what I claim as new and desire to secure by Letters Patent, is:

1. A valve device comprising:
(a) a valve body having a bore therein,
(b) said bore having a plurality of counterbores progressively increasing in size and contiguous with said bore,
(c) a valve seat in the largest of said plurality of counterbores and disposed transversely thereof between a fluid pressure supply passage communicating with said largest counterbore on one side of said seat, and a delivery passage communicating with said largest counterbore on the other side of said seat,
(d) a valve member having one end slidably received in said bore, an intermediate portion larger in diameter than said one end portion and slidably received in the smallest one of said counterbore, and an upper end portion disposed in said largest counterbore and having a larger diameter than said intermediate portion and a smaller diameter than said largest counterbor, said upper end portion seatable on said seat on said one side thereof,
(e) means biasing said valve member into engagement with said valve seat,
(f) hollow exhaust stem means extending into said largest counterbore and movable in a first direction axially thereof to firstly, seat upon said valve member, to secondly, separate said valve member from said seat in opposition to said biasing means upon further axial movement thereof and movable in the opposite direction thereafter to effect reseating of said valve member by said biasing means and thereafter disengage therefrom, and
(g) first shoulder means on said valve member formed by the intersection between said one end portion thereof and said intermediate portion thereof, and second shoulder means on said valve member formed by the intersection of said intermediate portion thereof with said upper end portion thereof,
(h) passage means interconnecting said delivery passage with said smallest counterbore to provide delivery pressure therein acting upon said first shoulder means,
(i) said second shoulder means having a predetermined area whereby the force of supply pressure thereon provides a predetermined seating force upon said valve member, and
(j) said first shoulder means having a predetermined area whereby separation of said hollow stem from said valve member after said valve is reseated provides an upward force on said valve member as a result of delivery pressure thereon to offset the force of exhaust from said delivery passage upon said valve member tending to separate said valve member from said hollow stem.

2. The valve device of claim 1, further characterized in that said valve member includes a through bore registering with said hollow stem at one end and intercommunicating said largest counterbore with said bore when said hollow stem is separated from said valve member to effect exhaust of the delivery passage whereby a seating force is provided on the bottom end of said valve member.

3. The valve device as recited in claim 2 in combination with a manual operator device for moving said hollow valve stem to selectively seat and unseat said valve member.

References Cited

UNITED STATES PATENTS

| | | | |
|---|---|---|---|
| 1,700,325 | 1/1929 | Mack | 251—296 |
| 2,295,154 | 9/1942 | Brower | 251—296 X |
| 2,641,297 | 6/1953 | Baldwin | 251—130 X |
| 2,713,882 | 7/1955 | Wilkes | 151—5 X |
| 2,745,429 | 5/1956 | Crookston | 137—627.5 X |
| 2,986,168 | 5/1961 | Sikula | 137—627.5 X |
| 3,084,676 | 4/1963 | Herion | 251—130 X |
| 3,168,352 | 2/1965 | Stelzer | 137—627.5 X |

CLARENCE R. GORDON, *Primary Examiner.*